Figure 1:
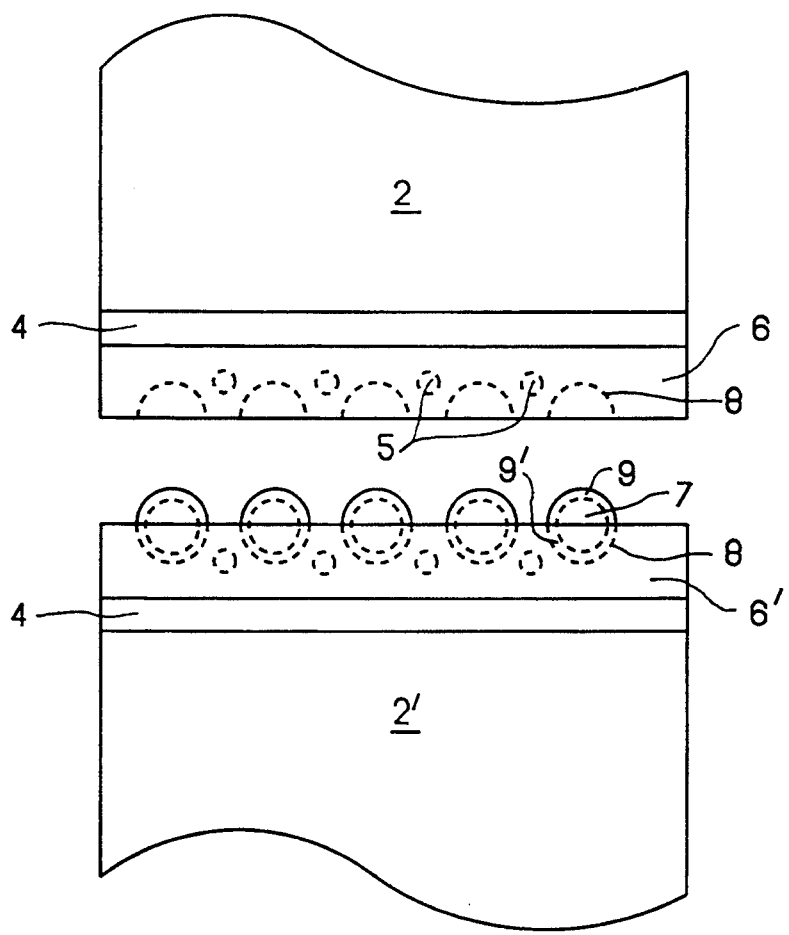

United States Patent [19]

Scolamiero et al.

[11] Patent Number: 5,368,800
[45] Date of Patent: Nov. 29, 1994

[54] METHOD OF MOLDING OBJECTS WITHIN A MOLDING MACHINE HAVING A GROOVED INSULATION BOARD

[75] Inventors: Stephen Scolamiero, Abington; Henry Conaty, Dighton; Richard Viveiros, Acushnet, all of Mass.

[73] Assignee: Acushnet Company, Fairhaven, Mass.

[21] Appl. No.: 106,166

[22] Filed: Aug. 13, 1993

Related U.S. Application Data

[60] Division of Ser. No. 802,906, Dec. 6, 1991, Pat. No. 5,259,752, which is a continuation of Ser. No. 593,123, Oct. 5, 1990, abandoned.

[51] Int. Cl.⁵ ............................................. B29C 43/02
[52] U.S. Cl. ..................................... 264/219; 264/320
[58] Field of Search .................. 83/875; 264/219, 319, 264/320

[56] References Cited

U.S. PATENT DOCUMENTS

| | | | |
|---|---|---|---|
| 3,016,317 | 1/1962 | Brunner | 428/167 |
| 3,096,545 | 7/1963 | Rowland | 425/394 |
| 3,387,420 | 6/1968 | Long | 428/167 |
| 3,880,561 | 4/1975 | Ferro | 425/169 |
| 4,044,984 | 8/1977 | Shimizu et al. | 425/127 |
| 4,244,761 | 1/1981 | Remi et al. | 428/167 |
| 4,465,729 | 8/1984 | Cancio et al. | 428/167 |
| 4,753,160 | 6/1988 | Baird et al. | 425/406 |
| 5,069,950 | 12/1991 | Crookston, Sr. | 428/167 |
| 5,086,639 | 2/1992 | Wallman | 100/258 A |

Primary Examiner—Jay H. Woo
Assistant Examiner—Robert B. Davis
Attorney, Agent, or Firm—Pennie & Edmonds

[57] ABSTRACT

An insulation board for a molding press is disclosed. The insulation board having a depth and having a plurality of grooves suitably cut at right angles to each other. The grooves having depths of at least one-half the board depth serve to reduce pressure variations transmitted by the molding press during the molding operation.

4 Claims, 1 Drawing Sheet

METHOD OF MOLDING OBJECTS WITHIN A MOLDING MACHINE HAVING A GROOVED INSULATION BOARD

This is a division of application Ser. No. 07/802,906, filed Dec. 6, 1991, now U.S. Pat. No. 5,259,752; which is a continuation of 07/593,123, filed Oct. 5, 1990, now abandoned.

The present invention relates to insulation board for molding machines and, in particular, relates to compression and injection molding operations wherein a plurality of molds, notably golf ball molds, are retained in a mold frame.

In the compression molding of items such as golf balls, the molding is accomplished in a mold assembly comprising a pair of opposed mold plates, each of which contains a plurality of individual golf ball half molds or mold cups within a mold frame. The mold frame has openings for receiving the individual molds.

In the manufacture of golf balls by compression molding, preformed golf ball cover half shells are placed about a golf ball core, the assembly is placed in the lower mold cups, the top mold cups joined to form the mold assembly, and the cover shells are subjected to sufficient heat and pressure so that they melt, knit together, form dimples and make the basic golf ball structure. After the cover stock has been molded about the core, the mold is then cooled so that it in turn cools the cover stock to solidify it before the mold is reopened.

Standard compression molding techniques used today in the manufacture of golf balls have one or more channels running between adjacent rows of molds in the mold frame. Heating or cooling fluid as required is run through these channels in order to heat and cool the mold frame which in turn heats or cools the individual molds to change the temperature of the cover of the balls, see for example U.S. Pat. Nos. 4,508,309 and 4,757,972.

It is has been found that precise control of the temperatures and pressures in and around the molds is essential to obtain proper conformation of molded golf balls. The mold frames with their mold cups are generally set in a press which applies the pressure needed for the molding operation. The metal press has the ability to act as a huge "heat sink", exchanging heat with the mold frames and decreasing response time with respect to changing the temperature of the mold frames. If the press has not been insulated from the mold frames in any way, so much heat is transferred by the thermal medium used to heat up and cool down the mold frames that the operation becomes quite inefficient. This is especially true where high molding temperatures are required such as in the molding of Surlyn ionomer-covered golf balls.

A solution to this problem in the past has been to place an insulating device such as an insulation board between the press and the mold frames. This insulating board substantially reduces the amount of heat transfer with the press; however, additional problems have arisen.

It has been found by the applicant that if the insulation board is not substantially planar with respect to the flat back of the mold frame and the corresponding flat plate of the hydraulic press, variations in the amount of pressure applied by the press during the molding operation will occur. Irregularities in the planarity of the insulating board can occur due to warping during the manufacturing process, during transit to the buyer, or during use. It has been found that if a 2 foot by 2 foot (0.6 m × 0.6 m) insulation board is warped out-of-planar by as little as 0.004" (0.01 cm), pressure variations will occur during the molding operation. In the field of golf balls, pressure variations caused by this slight warping can result in golf balls which are unacceptably out-of-round and which cannot be considered premium quality. A response to this problem in the past has been to dismantle the molding machine, remove the insulation board, and grind down the insulation board to a substantially flat plane. The grinding down of the boards is extremely time-consuming and messy and has only been considered a reasonable solution to the problem because no other solution was known.

The applicant has now discovered that the out-of-planarity problem can be solved by the surprisingly simple solution of cutting grooves in the insulation board at various places. These grooves allow the insulation board to transmit the pressure of the press equally, without the variations that cause out-of-round distortions in products such as golf balls. The grooves are preferably cut so that they are orthogonal to each other.

Figure 2:
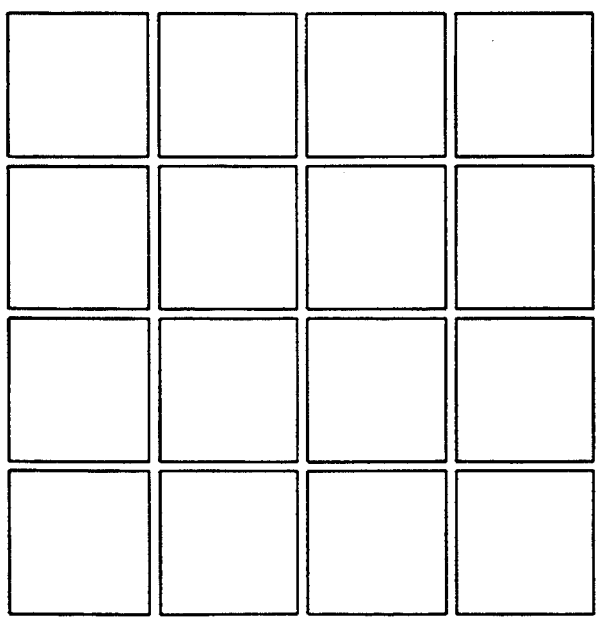

The invention may be more fully understood with reference to the following drawings wherein:

FIG. 1 is a front elevation view of a molding press with the insulation board and the mold frame therein; and FIG. 2 is a top view of the insulation board of the present invention showing a suitable layout for the grooves in the board.

FIG. 1 shows the top and bottom platens 2, 2' of a hydraulic press (not shown). Insulation boards 4 are secured to both the top and bottom platens. Top and bottom mold plates 6, 6' with mold cups 8 and fluid channels 5 are secured to the platens 2, 2' with insulation boards 4 between the platen 2 and the top mold plate 6 and between the platen 2' and the bottom mold plate 6'. A golf ball core 7 is shown in one of the cups 8 with golf ball half shells 9, 9' above and below it respectively.

FIG. 2 shows the insulation board 4 of the present invention with grooves 10 therein. The grooves may be of any dimension and laid out in any arrangement as long as they are sufficient for the insulation board to maintain its planarity to a sufficient degree for the article being molded and as long as the remaining insulation board is sufficient to support the mold without distortion. The squares formed by the intersecting grooves do not necessarily have to be the same size. However, it is preferred that all of the squares are the same size. The number of squares can vary. Good results on a 2 foot by 2 foot (0.6 m × 0.6 m) board have been found with one groove in a longitudinal direction and one in a latitudinal direction, making four squares. Better results have been found with two grooves in each of the longitudinal and latitudinal directions, making nine squares. Best results have been obtained with three grooves in each of the longitudinal and latitudinal directions, making sixteen squares.

The depth of the grooves may also vary. The essential criterion is that the grooves must not be deep enough to destroy the structural integrity of the board for handling purposes. It is preferred that the grooves extend at least half-way through the board and it is more preferred that the grooves extend at least three-quarters of the way through the board.

The width of the grooves may also vary. The width is suitably about 1/32" to ½" (0.08 cm to 1.3 cm) and it is preferred that the width be about ⅛" to ¼" (0.3 cm to 0.6 cm).

Best results have been obtained by using a board that is 2'×2' (0.6 m×0.6 m) and 1" (2.5 cm) deep. Three longitudinal and three latitudinal grooves are cut, making sixteen equally-sized squares. The grooves are 3/16" (0.05 cm) wide and ¾" (1.9 cm) deep.

The grooves are suitably made using a conventional saw blade, however, any other suitable cutting device may also be used to form the grooves, such as a laser.

The board may be made of any material suitable for the insulating and pressure purposes. Suitable materials are, for example, mineral wool, asbestos, cement board, glass fibers, or filled plastics. Applicant has found that a suitable material for the board is a glass fiber material in a thermosetting resin such as that marketed under the trade name Glasstherm.

Applicant has used the board of the present invention for over 35 weeks and the problems that have plagued the applicant in the past have not occurred. There have been reduced numbers of out-of-round balls due to pressure variations in the molding operation and there has been no need to grind down the board to a proper degree of planarity.

It will be understood that the claims are intended to cover all changes and modifications of the preferred embodiments of the invention herein chosen for the purpose of illustration which do not constitute a departure from the spirit and scope of the invention.

What is claimed is:

1. In a method of molding objects using molds having platens and mold plates comprising
    1) selecting at least one insulating board having two spaced-apart planar surfaces with a board depth therebetween;
    2) forming in said board a plurality of grooves, said grooves being of a depth dimension of at least one-half the board depth;
    3) placing the board with such grooves between the platen and mold plate; and
    4) causing platens to exert pressure on a mold plate through said grooved board to close the molds.

2. The method of claim 1 wherein there is at least one groove in the longitudinal direction of said board and at lest one groove in the latitudinal direction of said board.

3. The method of claim 1 wherein said grooves are cut to a depth of at least three-quarters of the way through said board.

4. The method of claim 1 wherein the grooves are between 1/32" and ½" wide.

* * * * *